United States Patent
Hepp et al.

(10) Patent No.: US 9,221,215 B2
(45) Date of Patent: Dec. 29, 2015

(54) METHOD AND DEVICE FOR THE CONTINUOUS WELDING OF PLASTIC COMPONENTS OF A PRODUCT

(75) Inventors: Franz Hepp, Metzingen (DE); Oliver Roehl, Schlierbach (DE)

(73) Assignee: bielomatik LEUZE GMBH & CO.KG, Neuffen ( * ) Notice: Subject to any disclaimer, the term of this patent is extended or adjusted under 35 U.S.C. 154(b) by 47 days.

(21) Appl. No.: 13/825,025

(22) PCT Filed: Nov. 17, 2011

(86) PCT No.: PCT/EP2011/005786
§ 371 (c)(1),
(2), (4) Date: Apr. 15, 2013

(87) PCT Pub. No.: WO2012/065742
PCT Pub. Date: May 24, 2012

(65) Prior Publication Data
US 2013/0233481 A1 Sep. 12, 2013

(30) Foreign Application Priority Data
Nov. 17, 2010 (DE) .......................... 10 2010 051 452

(51) Int. Cl.
*B29C 65/14* (2006.01)
*B29C 65/02* (2006.01)
(Continued)

(52) U.S. Cl.
CPC ............. *B29C 65/1406* (2013.01); *B29C 65/02* (2013.01); *B29C 65/14* (2013.01); *B29C 65/1412* (2013.01); *B29C 65/1435* (2013.01); *B29C 65/1454* (2013.01); *B29C 65/1464* (2013.01); *B29C 65/1635* (2013.01); *B29C 65/1654* (2013.01); *B29C 65/1664* (2013.01); *B29C 65/787* (2013.01); *B29C 65/7861* (2013.01); *B29C 65/7882* (2013.01); *B29C 66/54* (2013.01); *B29C 66/65* (2013.01); *B29C 66/836* (2013.01); *B29C 66/83411* (2013.01); *B29C 66/83421* (2013.01); *B29C 66/849* (2013.01); *B29C 66/8432* (2013.01); *B65B 7/2878* (2013.01); *B29C 65/1416* (2013.01);
(Continued)

(58) Field of Classification Search
CPC B29C 65/14; B29C 65/1406; B29C 65/1435; B29C 65/1434; B29C 65/1454; B29C 65/1412; B29C 65/02; B29C 65/1635; B29C 65/1664; B29C 65/7861; B29C 65/787; B29C 65/7882; B29C 66/54; B29C 66/55
USPC ...................... 156/272.2, 272.8, 379.6, 380.9
See application file for complete search history.

(56) References Cited

U.S. PATENT DOCUMENTS 6,296,734 B1 10/2001 Albertson
6,444,946 B1 9/2002 Korte
(Continued)

FOREIGN PATENT DOCUMENTS

EP 1721831 A1 * 11/2006

*Primary Examiner* — Daniel McNally
(74) *Attorney, Agent, or Firm* — Andrew Wilford

(57) ABSTRACT

For continuous welding of plastic components (1, 2) of a product along a join region extending over the circumference, the plastic components (1, 2) to be welded are first positioned in the join position thereof and fixed therein. Then, for the welding process, the product is transported past a fixed heat source (5) and is subjected to its own rotary movement in the region of the fixed heat source (5), in addition to the transport movement, in order to insert the welding energy into the join region.

10 Claims, 3 Drawing Sheets

Figure 1:
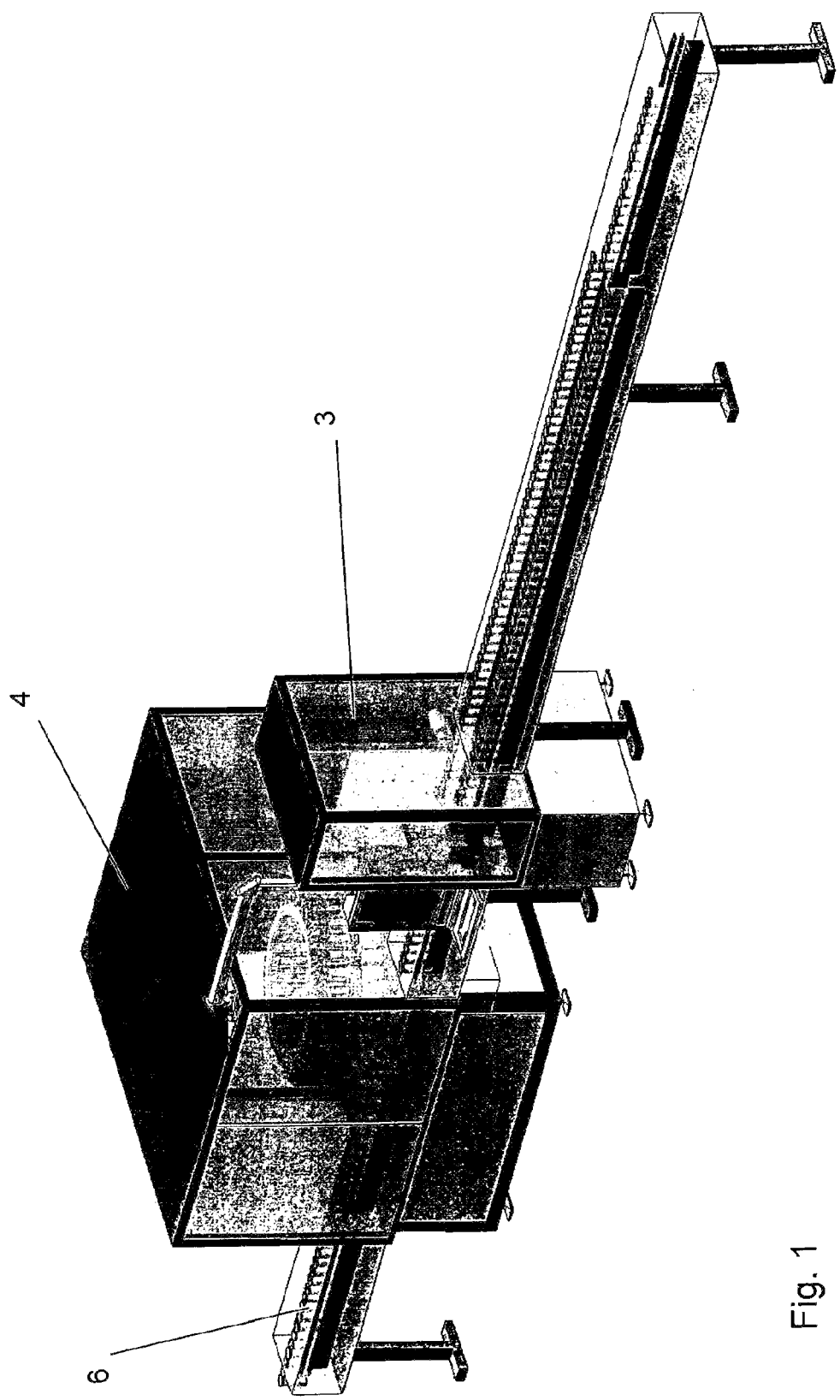

(51) Int. Cl.
*B29C 65/78* (2006.01)
*B29C 65/00* (2006.01)
*B65B 7/28* (2006.01)
*B29C 65/16* (2006.01)
*B29L 31/00* (2006.01)

(52) U.S. Cl.
CPC ......... *B29C 65/1419* (2013.01); *B29C 65/1616* (2013.01); *B29C 65/1619* (2013.01); *B29C 65/1674* (2013.01); *B29C 66/71* (2013.01); *B29L 2031/712* (2013.01); *B29L 2031/7548* (2013.01); *Y10T 156/10* (2015.01)

(56) References Cited

U.S. PATENT DOCUMENTS

2002/0100540 A1* 8/2002 Savitski et al. ............... 156/157
2007/0131639 A1 6/2007 Nakaya

* cited by examiner

METHOD AND DEVICE FOR THE CONTINUOUS WELDING OF PLASTIC COMPONENTS OF A PRODUCT

CROSS REFERENCE TO RELATED APPLICATIONS

This application is the US-national stage of PCT application PCT/EP2011/005786 filed 17 Nov. 2011 and claiming the priority of German patent application 102010051452.7 itself filed 17 Nov. 2010.

The invention relates to a method of and an apparatus for continuously welding together plastic parts of a product along a joint region that extends around its circumference.

A known approach for welding plastic parts is to use a laser to apply the welding energy required to heat and melt the plastic at the joint region. EP 1 048 439 discloses a method of this type in which a through-welding process is used whereby a part that is transparent to laser light is welded to a part that is opaque to laser light. To accomplish this, the laser light source is moved along the joint region to melt the plastic while the parts are clamped relative to each other.

The known methods do not allow high cycle times and corresponding high unit production rates to be achieved for welding plastic parts. High cycle times and unit production rates are not achieved, for example, when producing final packaging for food or personal care products, or when manufacturing mass-produced medical products such as hollow needles. The closure that is securely clamped on a container typically is also secured by welding when these products are made.

The object of this invention is therefore to provide an apparatus for and a method of continuously welding together plastic parts that enables products to be produced with high cycle times and correspondingly high unit production rates.

This object is achieved according to the invention by an approach wherein the plastic product parts be welded are first moved into their joined position and secured there, after which the product for welding is conveyed past a stationary heat source, the product being rotated when being conveyed past the stationary heat source so as to apply the welding energy to the joint region.

According to the invention, the products have a joint region that extends around their circumferences. During welding they undergo two superimposed motions, of which one motion functions for transporting the product. The second product rotation enables the relative motion vis-à-vis the heat source to be executed such that the desired amount of welding energy is introduced into the entire joint region.

Claim 9 relates to an apparatus that is provided and suitable for implementing a method according to the invention. The subordinate claims comprise preferred, here especially preferred embodiments of the invention.

The additional product rotation can be provided by appropriately designed conveying elements. When welding products with curved surfaces, it is advantageously possible to generate the rotation by having the curved surface of the conveyed products be guided so as to roll along an outer surface, or a stationary or movable counter-holder. As a result, no separate drive means is required for one outer surface for the rotation, while, on the other hand, the approach provides a high level of flexibility by allowing a counter-holder to be moved to a specified position in which the containers can then roll along and in which it can then be moved back, for example, into a rest position.

Laser light sources are advantageously employed as the heat sources. Other suitable heat sources have a broadband infrared heat source in the shortwave or medium-wave range of the infrared, in particular, glass-tube, ceramic, metal-foil, or carbon heaters.

The laser light can be generated in point form or line form.

Welding is preferably effected in a through-welding process in which the outer part is transparent while the inner part is opaque to laser light. A possible alternative approach would be impact welding using the laser. The method of producing products is especially advantageous whereby a part is formed into rotationally symmetrical, specifically cylindrically tubular shape. The part is then turned in an additional rotation about its own axis, for example by guiding it so as to roll along an outer surface. A part of angular cross-section can also be welded by adjusting the rotational speed to match the product rotation of the part at the corners.

The invention will be described in more detail with reference to a method of and an apparatus for welding a closure to a cylindrically tubular beverage container.

FIG. 1 is a perspective view of the apparatus.

Figure 2:
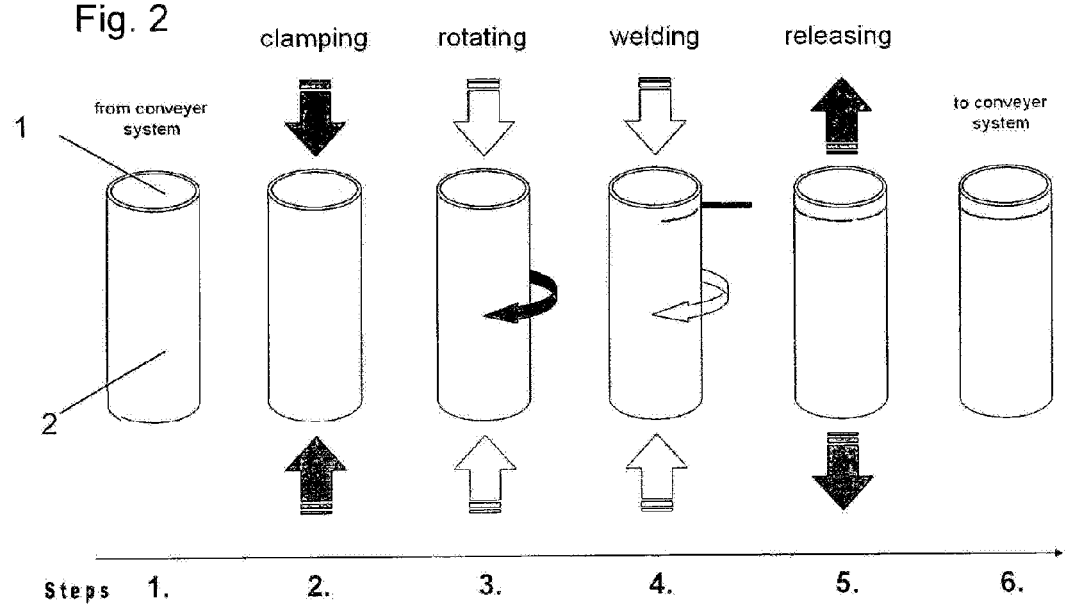

FIG. 2 schematically illustrates individual operational steps.

Figure 3:
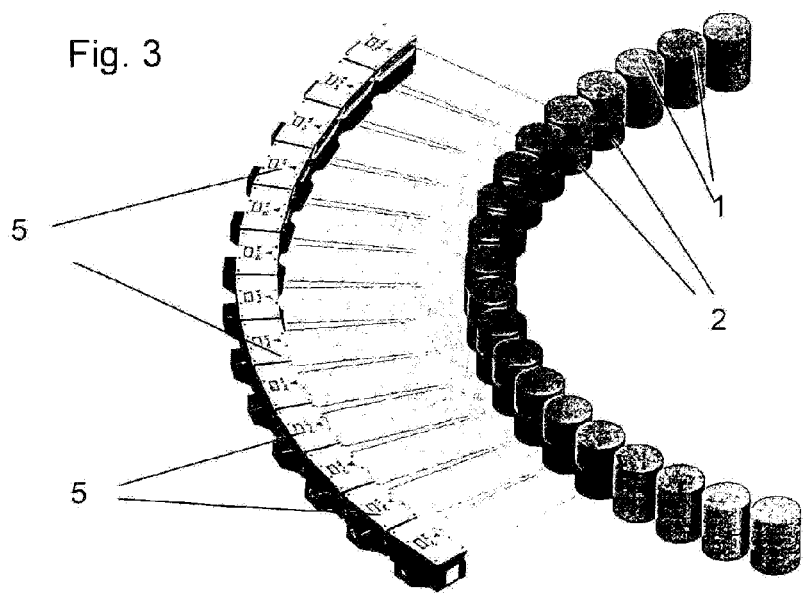

FIG. 3 shows the arrangement of the laser emitters used as a heat source.

Figure 4:
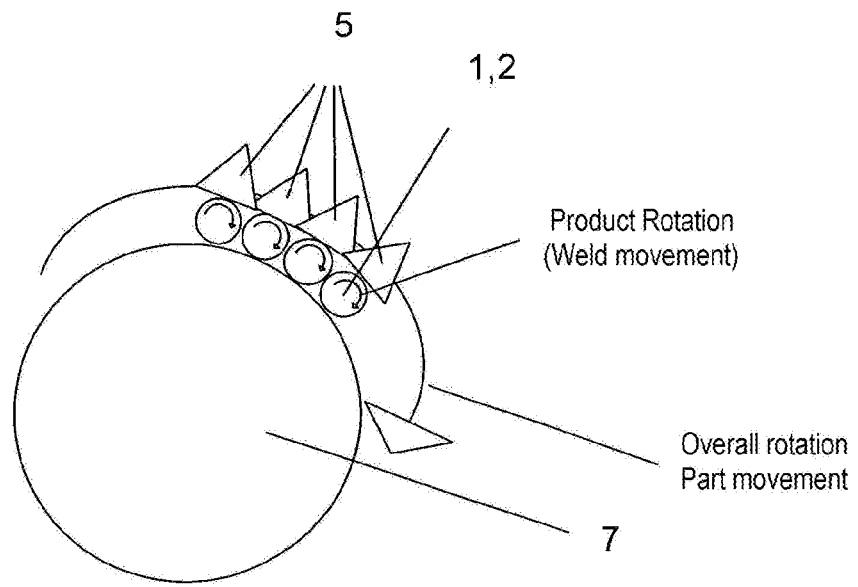

FIG. 4 schematically illustrates generating the rotation by rolling along a circular segment of an outer surface during conveyance.

Figure 5:
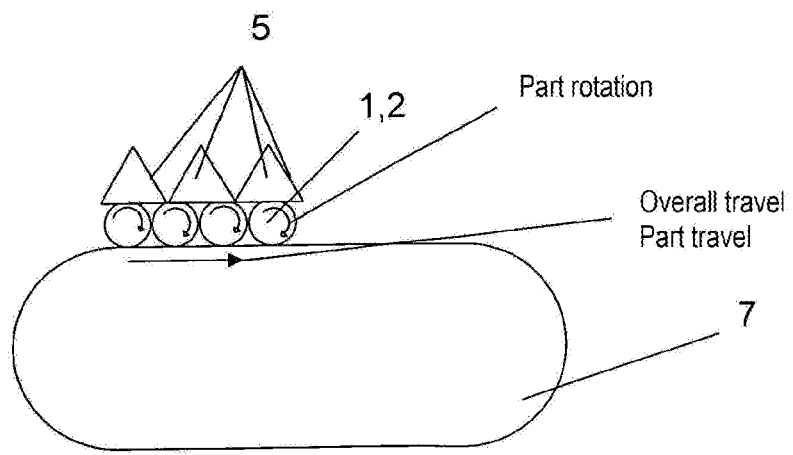

FIG. 5 schematically illustrates conveyance by a conveyor belt.

The function of the apparatus showed in the figures is to continuously weld a closure 1 of a container 2 holding a liquid to the container 2 itself. To this end, roughly circular closures 1 that have a collar are first clamped onto the liquid container 2. The collar is located here so as to be fitted either inside as shown in FIG. 2 or outside as shown in FIG. 3. Clamping the closure 1 on the container 2, which in the example is cylindrically tubular and thus rotationally symmetrical, results in the plastic parts to be welded (closure 1, the container 2) being moved into their joined position and secured in this position. The shape of the container 2 does not necessarily have to be cylindrical. It can also be of other geometrical shapes, where only the region of the container 2 that is to be provided with the closure 1 needs to be rotationally symmetrical.

As FIG. 1 shows how welding the container 2 and clamping the closure 1 is done in a station 3 from which closed containers 2 are continuously delivered in succession to a welding station 4. Instead of clamping, it is also possible to employ other equally effective methods or means. A series of laser light emitters 5 arrayed in a circular arc is the heat source in the welding station 4, which emitters are aimed toward the containers 2 that are also conveyed along a circular path. The laser sources used in the example are diode lasers that emit laser light along a line at a wavelength of 980 nm. The laser light can also be emitted so as to be directed onto the part to be welded as a point or in the form of multiple points as long as this is sufficient for the application. When a point-type laser source is used, the laser output can be adjusted for the position of the part according to its geometry. When multiple point sources are used, the laser output can be divided into corresponding zones and controlled. In the case of a linear arrangement, subdivided segments are provided in which the output can be adjusted as a function of the welding task.

As an alternative to the laser light source, it is also possible to use one or more infrared light sources in either the short- or medium-wave region, such as, for example, glass-tube, ceramic, metal-foil, or carbon heaters.

In order to weld the plastic parts (here the container 2 to the closure 1), the product is conveyed past the stationary heat source 5. As it is being conveyed past the stationary heat source 5, the product 1, 2 is rotated while being conveyed, as is illustrated schematically in FIG. 2. The rotation can be effected by providing the welding station 4 with a conveyor with conveying elements that can produce an additional rotation.

In the case of rotationally symmetrical parts, such as for example cylindrically tubular parts as in this embodiment, the additional rotation is effected about the parts' own axes. If the products have appropriately curved outer surfaces, they can be guided so as to roll along an outer surface, thereby generating the rotation. This avoids the need for a separate rotational drive.

The additional rotation enables the welding energy delivered to the joint region to be adjusted in terms of the implementation, number, and speed of the rotations. Welding is preferably effected by the so-called through-welding process in which the outer part (here either the container 2 as in FIG. 2, or the closure 1 as in FIG. 3) is transparent to laser light, while the inner part is opaque to laser light, with the result that the laser light is absorbed by the inner part and heats the joint region. During welding the products are passed through the welding station 4 continuously in order to achieve high cycle times and high unit production rates. Upstream of the welding station 4, the parts 1, 2 at the station 3 are moved into their joined position by clamps that are integrated into the conveyors. This then avoids any additional time for insertion or clamping operations. Also avoided are positioning times for presses and heating elements, which times are typical for cyclically operating machines.

Following the welding station 4, the products with the welded-together parts 1, 2 are passed on by a conveyor 6 for further processing, for example, to a packaging station.

FIGS. 4 and 5 show two different possible approaches to generating the rotation as the products (containers 2 with the closure 1) are being conveyed. In the embodiment of FIG. 4, products 1, 2 are conveyed while resting against a transport drum 7 on the side opposite the heat source 5, and thus rotated. Products 1, 2 thus move along a circular arc during welding.

In the embodiment of FIG. 5, the conveying action is effected during welding by a conveyor belt 7 along an essentially straight-line travel path. The additional rotation of the products 1, 2 is created either by being pressed against an outer surface by appropriately moved conveying elements.

The plastic parts (the container 2, the closure 1) are in each case manufactured from a weldable plastic, such as, for example, PE, PU, PVA, PET.

The invention claimed is:

1. A method of continuously welding together rotation-symmetrical outer and inner plastic parts of a product along a circular and circumferential joint region, the method comprising the steps of sequentially:
    moving the plastic parts to be welded first together into a joined position, and
    thereafter bracing the parts against a surface of a drum and rolling the parts on the surface of the drum past a stationary heat source directed at the joint region to introduce welding energy from the stationary heat source into the entire circumferential joint region as the respective parts roll on the drum past the stationary heat source.

2. The method according to claim 1, wherein a laser light is used as the heat source.

3. The method according to claim 2, wherein the laser light is generated as a point or a line.

4. The method according to claim 1, wherein a broadband infrared light source in either the short- or medium-wave region of the infrared is used as the heat source.

5. The method defined in claim 4, wherein the infrared light source is a glass-tube, ceramic, metal-foil, or carbon heater.

6. The method according to claim 1, wherein welding is effected using a through-welding process in that the outer part is transparent while the inner part is opaque to laser light.

7. An apparatus for continuously welding together rotation-symmetrical plastic parts of a product along a circular and circumferential joint region, the apparatus comprising:
    a device for juxtaposing the plastic parts at the joint region,
    a drum for engaging and rolling the parts while moving the engaged and rolling parts past a stationary heat source directed at the joint to introduce welding energy into the joint as the rolling parts move past the stationary heat source.

8. The apparatus according to claim 7, wherein an infrared light source in either the short-wave or medium-wave region of the infrared is used as the heat source.

9. The apparatus defined in claim 8, wherein the infrared light source is a glass-tube, ceramic, metal-foil, or carbon heater.

10. The apparatus according claim 7, wherein a laser light source is used as the heat source.

* * * * *